US008989759B2

(12) United States Patent
Guerrero (10) Patent No.: US 8,989,759 B2
(45) Date of Patent: Mar. 24, 2015

(54) METHODS AND APPARATUS FOR PROXIMITY BASED CALL TERMINATION

(75) Inventor: Michael Guerrero, Weehawken, NJ (US)

(73) Assignee: Vonage Network, LLC, Holmdel, NJ (US)

( * ) Notice: Subject to any disclaimer, the term of this patent is extended or adjusted under 35 U.S.C. 154(b) by 0 days.

(21) Appl. No.: 13/292,634

(22) Filed: Nov. 9, 2011

(65) Prior Publication Data

US 2012/0230486 A1 Sep. 13, 2012

Related U.S. Application Data

(60) Provisional application No. 61/451,218, filed on Mar. 10, 2011.

(51) Int. Cl.
| H04W 40/00 | (2009.01) |
| H04W 74/00 | (2009.01) |
| H04M 7/00 | (2006.01) |
| H04M 3/54 | (2006.01) |

(52) U.S. Cl.
CPC ........ *H04M 3/54* (2013.01); *H04M 2203/1091* (2013.01); *H04M 2242/14* (2013.01)
USPC .... 455/453; 455/445; 455/456.1; 379/220.01

(58) Field of Classification Search
USPC ........................... 455/435.1, 445; 379/220.01
See application file for complete search history.

(56) References Cited

U.S. PATENT DOCUMENTS

| 5,745,850 | A | 4/1998 | Aldermeshian et al. |
| 7,298,833 | B2 * | 11/2007 | Klein et al. ............... 379/201.02 |
| 7,383,052 | B2 * | 6/2008 | Moton et al. ............... 455/456.2 |
| 7,706,811 | B2 * | 4/2010 | Shkedi ........................ 455/456.1 |
| 2005/0063528 | A1 * | 3/2005 | Pearson et al. ........... 379/211.01 |
| 2006/0025156 | A1 * | 2/2006 | Campbell .................. 455/456.1 |
| 2006/0093121 | A1 * | 5/2006 | Sylvain .................... 379/220.01 |
| 2007/0066286 | A1 * | 3/2007 | Hurtta ........................ 455/414.1 |
| 2007/0167167 | A1 * | 7/2007 | Jiang ............................. 455/453 |
| 2007/0178900 | A1 * | 8/2007 | Frank et al. ................ 455/435.1 |
| 2008/0075261 | A1 * | 3/2008 | Ramanathan et al. ... 379/220.01 |
| 2009/0028318 | A1 | 1/2009 | Bhogal et al. |
| 2010/0172333 | A1 | 7/2010 | Bot |

OTHER PUBLICATIONS

International Search Report Issued in PCT/US2012/027814 on Sep. 28, 2012.
Written Opinion Issued in PCT/US2012/027814 on Sep. 28, 2012.

* cited by examiner

*Primary Examiner* — William Nealon
(74) *Attorney, Agent, or Firm* — Nixon & Vanderhye P.C.; Joseph Pagnotta (57) ABSTRACT

A system and method for automatic proximity based call termination determines when a mobile telephony device enters a predetermined area. When that occurs, call termination instructions are automatically issued to re-direct incoming telephone calls directed to the mobile telephony device to an alternate telephone number. In some instances, incoming telephone calls directed to the mobile telephony device may be simultaneously sent to both the mobile telephony device, and to an alternate telephone number. When the mobile telephony device leaves the predetermined area, the call termination instructions are automatically canceled, and calls directed to the mobile telephony device are only sent to the mobile telephony device.

23 Claims, 6 Drawing Sheets

METHODS AND APPARATUS FOR PROXIMITY BASED CALL TERMINATION

This application claims priority to the filing date of U.S. Provisional Application Ser. No. 61/451,218, filed Mar. 10, 2011, the contents of which are hereby incorporated by reference.

BACKGROUND OF THE INVENTION

It is now common for an individual to have both a mobile telephone that is assigned a mobile telephone number, as well as a home telephone that is assigned a home telephone number. Many individuals also have a business telephone that is assigned a business telephone number. Typically, the individual will carry the mobile telephone around as the individual moves from his residence, to his office, and then back to his residence.

Many telephone service providers allow an individual to issue call forwarding instructions that will cause incoming telephone calls directed to the individual's mobile telephone number to be re-directed to the individual's home or office telephone numbers. Likewise, it is also possible for an individual to issue call forwarding instructions that will cause incoming calls directed to the individual's office or home telephone numbers to be re-directed to the individual's mobile telephone number. This ensures that the individual can receive incoming telephone calls directed to any of his telephone numbers, regardless of the individual's present location.

While the ability to issue call forwarding instructions provides an individual with helpful capabilities, the actual issuance of such call forwarding instructions is not always convenient. To begin with, the individual must actively invoke the call forwarding instructions to cause the re-direction of calls. And the active invocation of call forwarding instructions may not always be convenient. Further, an individual may forget to issue call forwarding instructions when the re-direction of calls is desired.

Also, in many instances, a first telephone service provider will provide telephone service to the individual's mobile telephone, while a second telephone service provider provides telephone service to the individual's home telephone. Yet a third telephone service provider may provide telephone service to the individual's business telephone. Each of the three telephone service providers may require that call forwarding instructions be issued in different ways. As a result, the individual must remember all three different sets of call forwarding instructions, and the individual must remember which set of call forwarding instructions to use for each of his three telephones.

Also, it is possible for an individual to issue call forwarding instructions for one of his telephone numbers, and for the individual to forget to cancel the call forwarding instructions when they are no longer desired. For example, when an individual arrives at his office in the morning, the individual might issue a call forwarding instruction that causes incoming telephone calls directed to his mobile telephone number to be re-directed to his office telephone number. If the individual leaves his office at the end of the day and forgets to cancel this call forwarding instruction, then any calls directed to the individual's mobile telephone number will continue to be directed to his office telephone number. As a result, the individual is likely to miss any incoming calls directed to his mobile telephone number. Additionally, the individual is not likely to receive any cue that would allow the individual to take corrective action.

DETAILED DESCRIPTION OF PREFERRED EMBODIMENTS

Systems and methods employing the disclosed technology allow call forwarding or call completion instructions to be automatically issued whenever a mobile telephony device moves into or moves out of a particular location. In particular, the disclosed technology makes it possible to cause incoming telephone calls directed to a user's mobile telephone number to be automatically re-directed to an alternate telephone number if the user's mobile telephony device moves into a particular area. When the user's mobile telephony device moves out of that area, incoming telephone calls directed to the user's mobile telephone number are once again directed to the user's mobile telephony device.

In the following description, references are made to a user's mobile telephone and to a user's mobile telephony device. Both of these terms encompass traditional cellular telephones, as well as mobile telephony devices that include additional functionality, such as the ability to wirelessly communicate digital data. These terms also encompass mobile computing devices that include communications capabilities provided by either or both of a cellular transceiver and a wireless digital data transceiver. Examples of such devices include the Apple iPhone™, and mobile telephony devices running the Android™ operating system.

The following description also refers to call completion instructions, termination instructions and call forwarding instructions. These terms are used interchangeably to refer to instructions regarding how to route an incoming telephone call or some other type of telephony-based communication to one or more telephone numbers or to one or more selected destination devices. Termination instructions will be used as a generic term to refer to any type of instruction that causes a telephone call or some other type of telephony-based communication to be terminated in a manner that differs from a traditional termination to a telephony device associated with a telephone number. Examples of telephony-based communications other than telephone calls includes text messages and other forms of text-based or video-based messaging.

Also, the terms telephone call and call encompass traditional audio-only communications, as well as audio/video communications.

The term "call" or "telephone call" is used in the following description for ease of reference, clarity and brevity. However, all of the systems and methods described below which involve handling, routing and terminating calls would also apply to systems and methods of handling, routing and terminating other forms of telephony-based communications. Thus, the terms call and telephone call are intended to include other forms of telephony-based communications.

Termination instructions could result in an incoming call directed to a first telephone number being re-directed to a second, different telephone number. Termination instructions could also result in an incoming call directed to a first telephone number being routed to both the first telephone number, and a second telephone number. In this instance, the call may be connected to the first device to answer the call, or the call might be connected to all devices that answer the call. In the case of a text messages and other similar telephony-based communications, the text message could be delivered to telephony devices associated with one or both telephone numbers.

Termination instructions might also result in a call or another type of telephony-based communication being re-routed to a device other than a telephony device associated with a telephone number. For example, termination instructions could result in a video call being re-routed to a computer or to a television or display screen. Likewise, termination instructions could result in a text message being re-routed to a computer, a television or a display screen. Termination instructions could also result in a normal audio-only telephone call being re-routed to a computer, television or other audio capable device. Thus, termination instructions are not limited to re-routing telephone calls and other telephony-based communications to different telephone numbers or to different telephony devices. Such calls and telephony-based communications could also be routed to other types of devices.

Termination instructions might also cause an incoming telephone call directed to a first telephone number to be directed to a voicemail facility. The termination instructions could result in an incoming telephone call directed to a first telephone number being directed to a second telephone number, but if the call is not answered, the call may be directed to a voicemail facility for the first telephone number. In still other instances, if that call is not answered by a device associated with the second telephone number, the call may be directed to a voicemail facility associated with the second telephone number.

Figure 1:
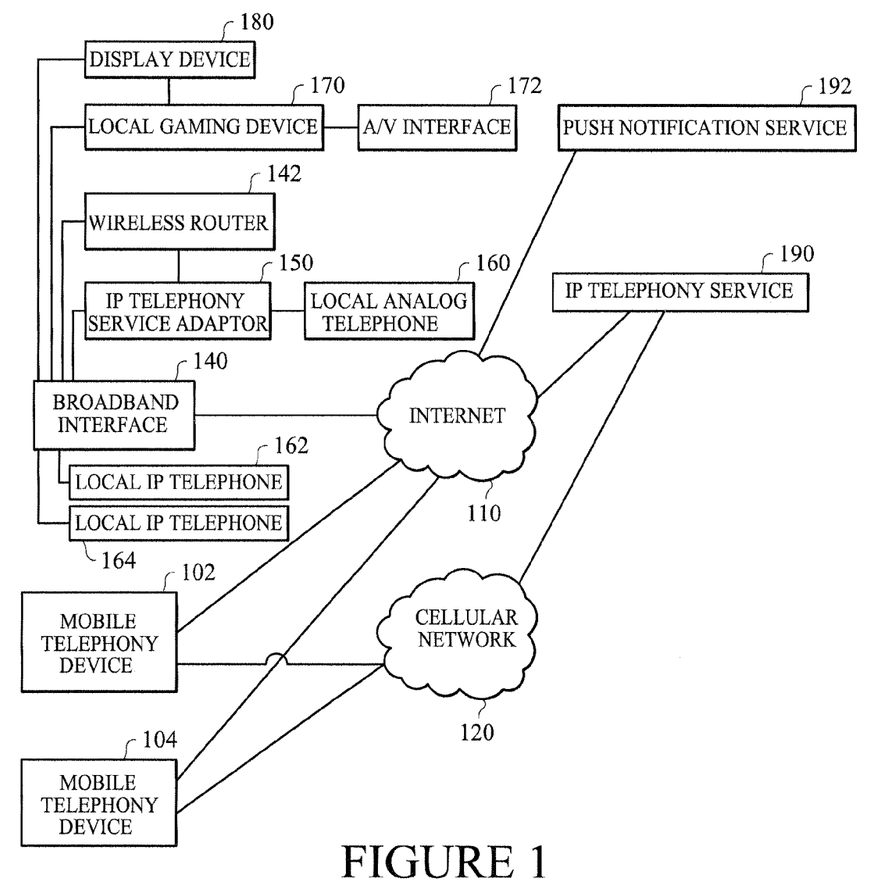
FIG. 1 is a diagram illustrating elements of systems which could be used to automatically issue call termination instructions in accordance with the subject invention.

FIG. 1 illustrates a first configuration of elements of a system that can accomplish automatic implementation of termination instructions. The elements shown in FIG. 1 would be located at multiple different physical locations. The mobile telephony devices would move into and out of at least one of the locations. The first embodiment illustrated in FIG. 1 has many of the elements located in a user's residence. Other embodiments described below have elements that are located in multiple residences and in an office.

As shown in FIG. 1, a broadband interface 140 coupled to the Internet 110 is located in a user's residence. In this embodiment, two local IP telephones 162, 164 are coupled to the broadband interface 140. In alternate embodiments, the local IP telephones 162, 164 may be coupled to an IP telephony service adaptor 150 that is itself coupled to the broadband interface 140. In still other embodiments, the local IP telephones 162, 164 may obtain a data connection via a wireless router 142 that is coupled to the broadband interface 140.

FIG. 1 also illustrates that a local analog telephone 160 present in the user's residence may be coupled to the IP telephony service adaptor 150. In this instance, the IP telephony service adaptor 150 would act as an interface that allows the local analog telephone 160 to place and receive telephone calls via a voice over IP telephony service provider.

FIG. 1 also illustrates that an IP telephony service provider 190 is connected to the Internet 110. The IP telephony service provider 190 may also have a direct connection to a cellular network 120. The IP telephony service provider 190 provides telephony services to the user's local telephones 160, 162, 164 that are located in the user's residence. In many instances, this will mean that a single telephone number is associated with all of the local telephones 160, 162, 164 in the user's residence. In alternate embodiments, different telephone numbers may be associated with different ones of the local telephones 160, 162, 164.

Figure 2:
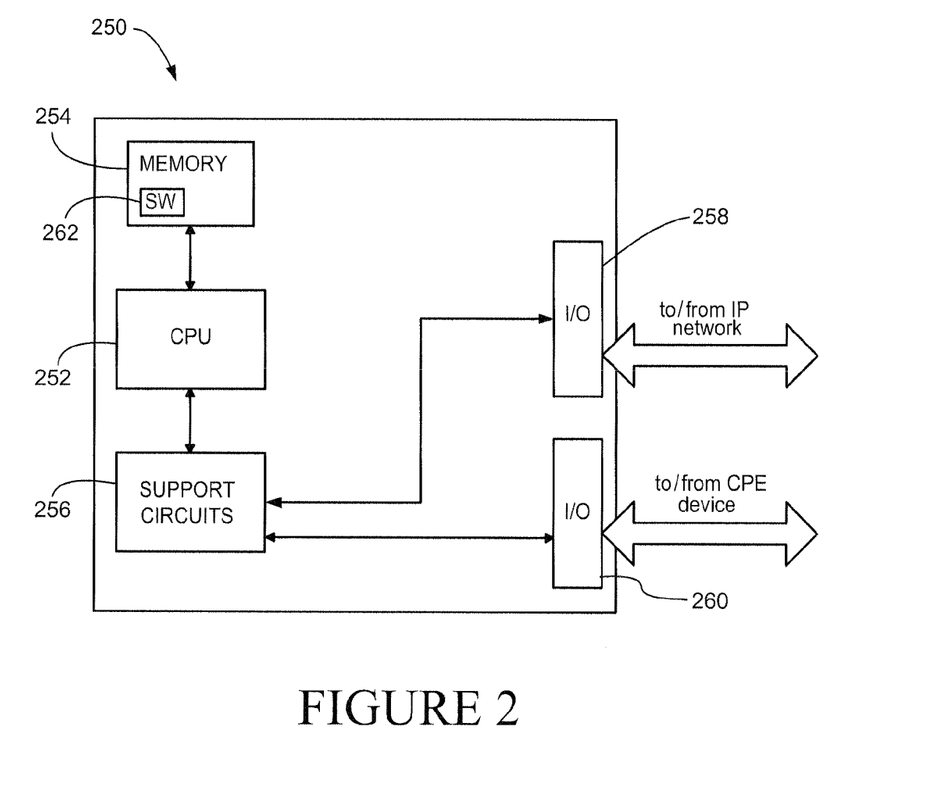
FIG. 2 is a diagram of various elements of a processor that forms part of an IP telephony system.

FIG. 2 illustrates elements of a computer processor 250 that can be used as part of the system operated by the IP telephony service provider 190 to accomplish various functions. The IP telephony service provider 190 could utilize multiple processors 250 located at various locations, along with their operating components and programming, each carrying out a specific or dedicated portion of the functions performed by the IP telephony service provider 190.

The processor 250 shown in FIG. 2 may be one of any form of a general purpose computer processor used in accessing an IP-based network, such as a corporate intranet, the Internet or the like. The processor 250 comprises a central processing unit (CPU) 252, a memory 254, and support circuits 256 for the CPU 252. The processor 250 also includes provisions 258/260 for connecting the processor 250 to customer equipment and to service provider equipment, as well as possibly one or more input/output devices (not shown) for accessing the processor and/or performing ancillary or administrative functions related thereto. The provisions 258/260 are shown as separate bus structures in FIG. 2; however, they may alternately be a single bus structure without degrading or otherwise changing the intended operability of the processor 250.

The memory 254 is coupled to the CPU 252. The memory 254, or computer-readable medium, may be one or more of readily available memory such as random access memory (RAM), read only memory (ROM), floppy disk, hard disk, flash memory or any other form of digital storage, local or remote, and is preferably of non-volatile nature. The support circuits 256 are coupled to the CPU 252 for supporting the processor in a conventional manner. These circuits include cache, power supplies, clock circuits, input/output circuitry and subsystems, and the like.

A software routine 262, when executed by the CPU 252, causes the processor 250 to perform processes of the disclosed embodiments, and is generally stored in the memory 254. The software routine 262 may also be stored and/or executed by a second CPU (not shown) that is remotely located from the hardware being controlled by the CPU 252. Also, the software routines could also be stored remotely from the CPU. For example, the software could be resident on servers and memory devices that are located remotely from the CPU, but which are accessible to the CPU via a data network connection.

The software routine 262, when executed by the CPU 252, transforms the general purpose computer into a specific purpose computer that performs one or more functions of the IP telephony service provider 190. Although the processes of the disclosed embodiments may be discussed as being implemented as a software routine, some of the method steps that are disclosed therein may be performed in hardware as well as by a processor running software. As such, the embodiments may be implemented in software as executed upon a computer system, in hardware as an application specific integrated circuit or other type of hardware implementation, or a combination of software and hardware. The software routine 262 of the disclosed embodiments is capable of being executed on any computer operating system, and is capable of being performed using any CPU architecture.

Returning now to FIG. 1, two mobile telephony devices 102 and 104 would be possessed by one or more users that maintain the residence where the broadband interface 140, IP telephony service adaptor 150, wireless router 142 and local telephones 160, 162, 164 are present. In some instances, both mobile telephony devices 102 and 104 are possessed by the same user. In other instances, the first mobile telephony device 102 is possessed by a first user, and the second mobile telephony device 104 is possessed by a second user.

For purposes of the following discussion, we will assume that first and second users live at the residence, that the first user possesses the first mobile telephony device 102 and that the second user possesses the second mobile telephony device 104. We will also assume that the IP telephony service 190 provides telephone service to the users' mobile telephony devices. As a result, the IP telephony service 190 is capable of controlling where incoming calls directed to the mobile telephony devices 102, 104 are routed.

In the following examples, the IP telephony service 190 acts on termination instructions to re-route incoming calls directed to the first and second mobile telephony devices 102, 104. However, in alternate embodiments, one or both of the mobile telephony devices 102, 104 may be provided with service by some other third party, such as a traditional cellular telephone service provider. In that instance, the IP telephony service 190 may communicate termination instructions to the third party telephony service provider that provides service to the mobile telephony devices 102, 104 to effect a termination of calls that differs from the normal and traditional termination methods. In still other embodiments, the mobile telephony devices 102, 104 may themselves communicate termination instructions to the telephony service provider that provides service to the mobile telephony devices 102, 104 to effect a termination of calls that differs from the normal and traditional termination methods.

The first and second users both carry their respective mobile telephony devices with them when they leave the residence. Thus, the first and second mobile telephony devices 102, 104 will be leaving and then returning to the residence on a regular basis.

Many users, when they bring a mobile telephony device into a residence, place the mobile telephony device in a specific location while they remain at the residence. For example, many users, when they enter their residence, will place the mobile telephony device on a counter or a piece of furniture adjacent the entrance to the residence. This ensures that the mobile telephony device is not misplaced within the residence, and it ensures that the mobile telephony device will be readily available when the user prepares to leave the residence.

While a mobile telephony device will tend to remain at a specific location in the residence while the user is home, the user tends to move to different locations within the residence. And if the user moves too far from the location of the mobile telephony device, the user may be unable to hear the mobile telephony device ringing when an incoming call is being received. This can result in missed calls and an inability to communicate with a third party about an urgent matter.

One solution to this problem is for call forwarding instructions or termination instructions to be issued automatically upon the user arriving at his residence. The termination instructions could specify that any incoming calls directed to the user's mobile telephony device be re-directed to a telephone number associated with the user's home telephones 160, 162, 164. Once such call termination instructions are issued, any incoming calls directed to the user's mobile telephony device will instead cause the user's home telephones 160, 162, 164 to ring. And if the home telephones are located throughout the residence, this will ensure that the user is aware of all incoming telephone calls. Likewise, the call termination instructions can be automatically canceled when the user and his mobile telephony device leave the residence.

Of course, the call termination instructions could also specify that any incoming calls directed to the user's mobile telephony device be directed to both the mobile telephony device and to the user's home telephones. In this instance, if the user is near the mobile telephony device when an incoming call is received, and both the mobile telephony device and the home telephones begin to ring, the user will know that the incoming call was originally intended for the user's mobile telephony device.

In order to automatically issue call termination instructions when the user and his mobile telephony device arrive at the user's residence, it is necessary to automatically detect that the user's mobile telephony device has arrived at the residence. Likewise, in order to automatically cancel the call termination instructions, it is necessary to automatically determine when the user's mobile telephony device has left the residence. This can be accomplished in any of multiple different ways.

In some embodiments, the user's mobile telephony device may be configured to automatically establish a wireless data link with a wireless router 142 present in the residence whenever the mobile telephony device comes within range of the wireless router 142. If the user's mobile telephony device is configured in this fashion, the wireless router 142 can be configured to cause the call termination instructions to be automatically issued.

For example, when the first user arrives at the residence, and the first user's mobile telephony device 102 comes within range of the wireless router 142, the mobile telephony device 102 would seek to establish a wireless data link with the wireless router 142. Once that link is established, the wireless router 142 would send a communication to the IP telephony service 190, via the broadband interface 140 and the Internet 110. The message would inform the IP telephony service 190 that the first user's mobile telephony device 102 has arrived at the residence. The IP telephony service 190 then automatically causes the implementation of predetermined call termination instructions for the first user's mobile telephony device 102.

The call termination instructions that are implemented, would be controlled by the first user. The first user could establish call termination instructions that cause all incoming calls directed to the first user's mobile telephony device 102 to be re-directed to a telephone number associated with the home telephones 160, 162, 164 in the user's residence. Alternatively, the call termination instructions could specify that all incoming calls directed to the first user's mobile telephony device 102 ring on both the mobile telephony device 102, and on all of the home telephones 160, 162, 164 present in the residence. The call termination instructions could indicate that the call should be connected to the first device that answers the call. Alternatively, the call termination instructions could specify that the call should be connected to all of the devices that answer the call.

In still other instances, the call termination instructions could specify that any incoming calls directed to the first user's mobile telephony device 102 be directed to a voicemail facility associated with the first user's mobile telephony device. In this instance, if a call is placed to the first user's mobile telephony device after the user arrives at his residence, the mobile telephony device 102 would not ring, and the call would go directly to voicemail. This type of call termination instruction might be useful if the mobile telephony device 102 is associated with the first user's business, and the first user does not wish to be disturbed with business calls after he has arrived at his residence.

When the first user and his mobile telephony device 102 leave the residence, the wireless router 142 could also be used to trigger the cancellation of the call termination instructions. For example, the mobile telephony device 102 and/or the wireless router 142 may be configured to periodically communicate with one another to ensure that the mobile telephony device 102 is still within range of the wireless router 142. If one of these periodic communications fails to occur, or if multiple consecutive periodic communication attempts fail, then the wireless router 142 would determine that the first user's mobile telephony device 102 is no longer in range and has left the residence. Upon making this determination, the wireless router 142 would send a message to the IP telephony service 190 that informs the IP telephony service that the first user's mobile telephony device 102 has left the residence. The IP telephony service 190 would then cause the cancellation of the call termination instructions that were in effect while the user and the mobile telephony device 102 were at the residence.

In alternate embodiments, an IP telephony service adaptor 150 present in the residence may be involved in the automatic implementation and cancellation of call termination instructions. The IP telephony service adaptor 150 would be provided by the IP telephony service 190. The IP telephony service adaptor 150 could be linked to the broadband interface 140 either through a wired connection, or via a wireless data link established through the wireless router 142. In alternate embodiments, the IP telephony service adaptor 150 might be hard wired to the wireless router 142. In still other embodiments, the IP telephony service adaptor 150 could include a wireless data transceiver. Regardless, the IP telephony service adaptor would be capable of communicating with the IP telephony service 190 via the Internet 110.

In some instances, when the wireless router 142 establishes a new wireless data connection with the first user's mobile telephony device 102, the wireless router 142 would report this fact to the IP telephony adaptor 150. Likewise, when the wireless router 142 determines that a wireless data link to the mobile telephony device 102 has failed, this fact is also communicated to the IP telephony service adaptor 150. The IP telephony service adaptor 150 would report these events to the IP telephony service 190, and the IP telephony service would cause the implementation or cancellation of call termination instructions for the mobile telephony device 102 as described above.

In yet another embodiment similar to the one described above, the IP telephony service adaptor 150 could be configured to periodically interrogate the wireless router 142 to determine if the wireless router 142 has established a wireless data link with the first user's mobile telephony device 102. This could include monitoring for data traffic on a specific port of the wireless router 142, because that port is used to communicate with the first user's mobile telephony device 102. While the mobile telephony device is gone from the residence, the response would be negative. However, when the mobile telephony device 102 returns to the residence, and establishes a data link with the wireless router 142, the response to one of these periodic inquiries would suddenly be positive. At that point, the IP telephony service adaptor 150 would send a message to the IP telephony service 190 indicating that the mobile telephony device 102 as arrived at the residence, and the call termination instructions could be automatically implemented.

Similarly, while the mobile telephony device remains at the residence, the responses to the periodic inquiries issued by the IP telephony service adaptor 150 would be positive. When the mobile telephony device 102 leaves the residence, and the data link to the wireless router 142 is severed, the response to one of the periodic inquiries would suddenly be negative. At that point, the IP telephony service adaptor 150 would send a message to the IP telephony service 190 indicating that the mobile telephony device 102 has left the residence, and the call termination instructions would be automatically canceled. The IP telephony service adaptor might also be configured such that a message indicating that the mobile telephony device has left the residence is not sent to the IP telephony service 190 unless multiple consecutive periodic inquiries to the wireless router 142 all return negative responses.

In still other embodiments, the first user's mobile telephony device 102 may be configured to establish communications with the IP telephony service adaptor 150 whenever the mobile telephony device 102 comes within range of the wireless data network to which the IP telephony service adaptor 150 is attached. In this instance, as soon as communications are established between the mobile telephony device 102 and the IP telephony service adaptor 150, either the mobile telephony device 102 or the IP telephony service adaptor 150 would send a message to the IP telephony service 190 to inform the service that the mobile telephony device 102 has arrived at the residence. The IP telephony service 190 would then cause the implementation of predetermined call termination instructions for the mobile telephony device 102.

The mobile telephony device 102 and/or the IP telephony service adaptor 150 would be configured to periodically communicate with one another, so long as the mobile telephony device 102 remains within range of the wireless data network to which the IP telephony service adaptor 150 is attached. When one or more of these periodic communications fail to occur, either the mobile telephony device 102 or the IP telephony service adaptor would determine that the mobile telephony device 102 has left the residence, and a message to that effect would be sent from either the mobile telephony device 102 or the IP telephony service adaptor 150 to the IP telephony service 190. The IP telephony service 190 would then cause the cancellation of the previously implemented call termination instructions for the mobile telephony device 102.

In instances where the mobile telephony device 102 is itself sending a notification to the IP telephony service 190 to inform the IP telephony service that the mobile telephony device 102 is either within range or out of range of the IP telephony service adaptor 150, the functionality could be provided by an application loaded on the mobile telephony device 102. The application could run constantly in the background, or the application might be triggered to load and run when the mobile telephony device 102 establishes communications with the IP telephony service adaptor 150.

In still other embodiments, the IP telephony service adaptor 150 may be configured to periodically attempt to establish a wireless data link to the first user's mobile telephony device 102. Such a link might be established via a wireless transceiver present in the IP telephony service adaptor 150, or such a wireless data link might be established between the IP telephony service adaptor 150 and the mobile telephony device 102 via the wireless router 142.

Whenever the IP telephony service adaptor 150 is successful in establishing a new data link to the mobile telephony device 102, the IP telephony service adaptor 150 would report to the IP telephony service 190 that the mobile telephony device has arrived at the residence. The IP telephony service 190 could then cause the implementation of the call termination instructions.

In this embodiment, the IP telephony service adaptor 150 may be configured to periodically communicate with the mobile telephony device 102. If one of those periodic communications fails, or if multiple consecutive periodic communications fail, the IP telephony service adaptor 150 would report to the IP telephony service 190 that the mobile telephony device 102 has left the residence. The IP telephony service 190 would then cause the cancellation of the call termination instructions.

In the embodiments described above, the mobile telephony device 102, the IP telephony service adaptor 150, the wireless router 142 or the broadband interface 140 send a communication to the IP telephony service 190 to inform the IP telephony service 190 that the mobile telephony device 102 has arrived at or left the residence. The IP telephony service 190 then causes either the implementation or cancellation of call termination instructions. If the IP telephony service 190 provides telephony service to the mobile telephony device 102, the IP telephony service would directly handle the re-direction of calls. If the mobile telephony device 102 is provided with service by a third party telephony service provider, the IP telephony service would send communications to the third party telephony service provider to cause the implementation and cancellation of the termination instructions. In still other embodiments, the mobile telephony device 102, the IP telephony service adaptor 150, the wireless router 142 or the broadband interface 140 may send communications directly to the third party telephony service provider to trigger the implementation and cancellation of termination instructions as the mobile telephony device 102 arrives at and leaves the residence.

Some mobile telephony devices are able to receive and act upon push notifications sent from a central location. Such push notifications could be used in this context to ask the user of the mobile telephony device whether call termination instructions should be implemented or canceled.

For example, Apple provides the Apple Push Notification Service (APNS), which is presently designed to send messages to at least the Apple iPhone™, the Apple iPad™ and the Apple iPod Touch™ devices. The push notifications are rigidly formatted messages that can be received by such devices anytime they are running and connected to either the Internet or a cellular data network.

Although the following description uses the APNS as an example, use of the APNS is not required, nor should this example be considered limiting. Other push notification services that have different message formats and different capabilities could also be used.

The Apple Push Notification Service allows an application that is installed on an Apple device such as the Apple iPhone™ to complete a registration process that results in the application receiving a device token. The device token uniquely identifies the mobile device itself. The application on the mobile device then provides this token to the service provider that created the application on the mobile device.

Once the service provider has possession of the token associated with a mobile device, the service provider can cause the APNS to send push notifications the mobile device. A request for a push notification that is sent from the service provider to the APNS would include the device token, and information about the type of push notification that is to be sent to the mobile device.

When the APNS receives a push notification request from a service provider, and it uses the information in the request to create a formatted push notification that it then delivers to the mobile device. The push notification can cause the mobile device to take several different actions.

For example, a push notification can cause the mobile device to update a number displayed on a badge associated with the service provider's application. The number usually indicates that new information is available to the application, and the number may indicate the quantity of the new information. When a user sees a number on an application badge, the user can press the badge to load and run the application, which usually results in the application requesting and obtaining the new information that is waiting.

A push notification can also cause a notification message to be displayed on the mobile device. The notification message will usually include two buttons that the user can press. One button, usually labeled as "DISMISS," allows the user to dismiss the notification message. If the user presses this button, the notification message will no longer be displayed, and no further action will be taken by the mobile device.

However, if the user pushes the other button, which is usually labeled as "VIEW," the mobile device will load and run the application on the mobile device that is associated with the service provider that caused the push notification to be sent.

When a service provider requests that a notification message be sent to a mobile device, the service provider can specify the text that is presented to the user as part of the notification message displayed on the mobile device. The wording to be displayed is part of the push notification request that is sent from the service provider to the APNS. And the APNS uses this information to format the push notification that is then delivered to the mobile device.

Returning now to the description of automatic call termination, in some embodiments, when the IP telephony service 190 receives a notification indicating that a mobile telephony device 102 has arrived at the residence, the IP telephony device could request that a push notification service 192 send a push notification to the mobile telephony device 102. The push notification could cause the mobile telephony device to issue an audible tone and to also display a message that says "Would you like to implement Home-Based Call Termination Instructions?" If the user hits the "Dismiss" key, the message would disappear from the display screen of the mobile telephony device 102, and no further action would be taken. Specifically, no call termination instructions would be implemented.

Alternatively, if the user hits the "View" key, an application on the mobile telephony device that was provided by the IP telephony service 190 would be activated. And that application would then send a message to the IP telephony service 190, either via the Internet 110 or via the cellular network 120, indicating that the user has asked to implement call termination instructions. Once the IP telephony service 190 receives this message, the IP telephony service 190 would cause the implementation of call termination instructions.

If the user chooses to implement call termination instructions upon arriving at his residence, then a push notification might also be used as part of a process to cancel the call termination instructions when the mobile telephony device leaves the residence. For example, when the IP telephony service 190 receives a message from one of the devices in the residence indicating that the mobile telephony device 102 has left the residence, the IP telephony service 190 could again cause the push notification service 192 to send a push notification to the mobile telephony device 102. The push notification could cause a tone to be played to the user, and it could cause the mobile telephony device 102 to display a message that reads "Would you like to cancel Home-Based Call Termination Instructions?" If the user hits the "Dismiss" key, the call termination instructions would be left active. If the user hit the "View" key, then the application on the mobile telephony device would be loaded, and the application would send a message to the IP telephony service 190 indicating that the call termination instructions should be canceled.

Figure 5:
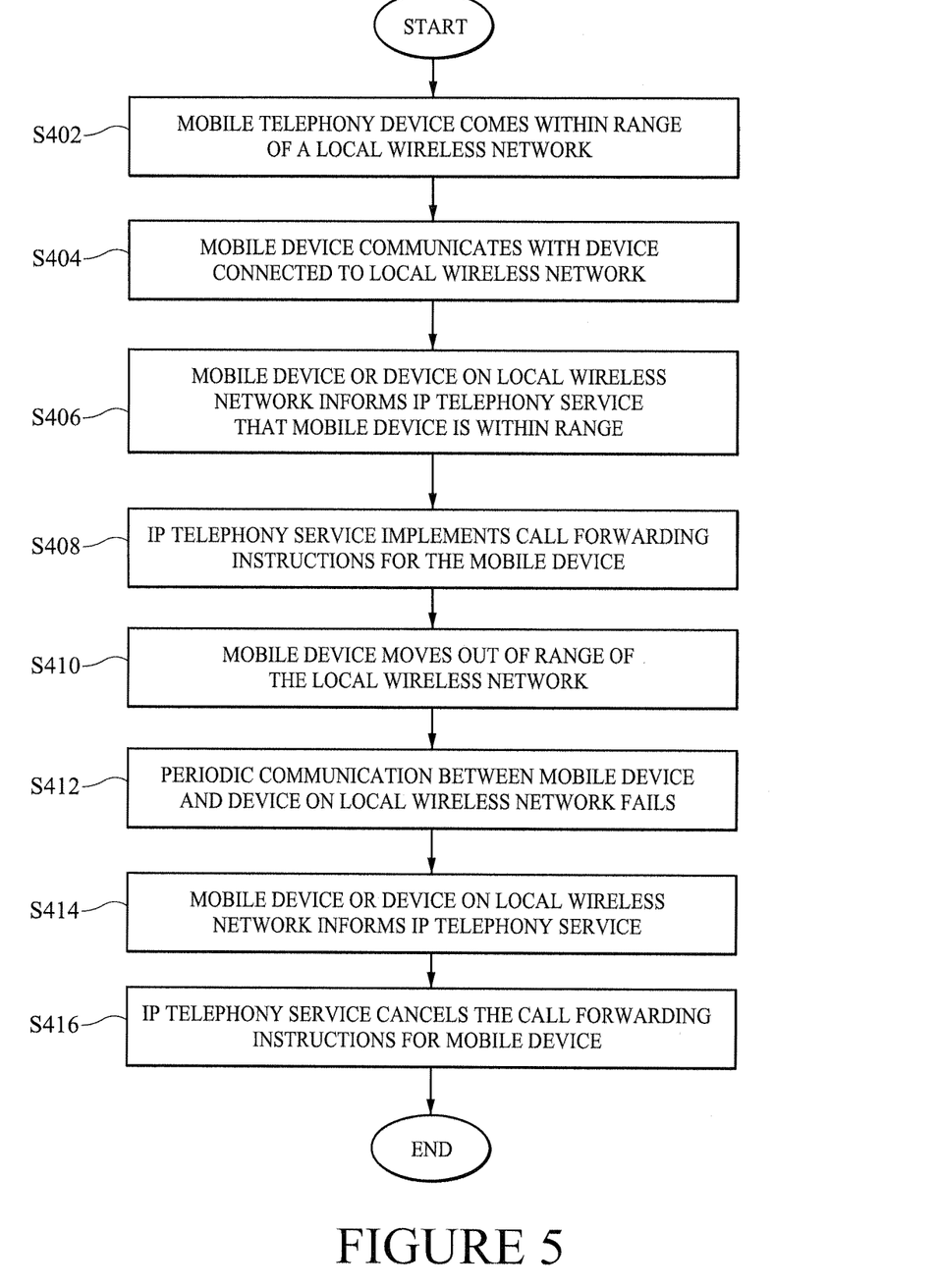
FIG. 5 is a diagram of steps of a method of issuing call termination instructions in accordance with the subject invention.

FIG. 5 illustrates steps of a generalized method of implementing and canceling call termination instructions based on the proximity of a mobile telephony device to a particular location. In this instance, the call termination instructions would be implemented or canceled based on the proximity of the mobile telephony device to a wireless network present in a user's residence.

The method illustrated in FIG. 5 begins with step S402, when a user's mobile telephony device comes within range of a wireless network maintained in the user's residence. In step S404, the mobile telephony device communicates with at least one device connected to the local wireless network. As explained above, this could include communications passing between the mobile telephony device and a wireless router, an IP telephony services adaptor, or some other device connected to the local wireless network.

In step S406, the mobile telephony device itself or one of the devices on the local wireless network sends a message to an IP telephony services provider to inform the IP telephony service that the user's mobile telephony device has arrived at the residence. In step S408, the IP telephony service causes the implementation of call termination instructions for the mobile telephony device. As explained above, the call termination instructions could cause incoming calls directed to the user's mobile telephony device to be handled in multiple different ways. The call termination instructions would remain in place until the user takes a positive action to cancel the call termination instructions, or until the mobile telephony device leaves the user's residence.

In step S410, the mobile telephony device moves away from the user's residence, and out of range of the wireless data network in the user's residence. In step S412, one or more periodic communications between the mobile telephony device and one or more devices connected to the local wireless network fails. Then, in step S414, the mobile telephony device itself or one of the devices connected to the local wireless network sends a message to the IP telephony service indicating that the mobile telephony device has left the user's residence. In step S416, the IP telephony service causes the cancellation of the call termination instructions.

In the foregoing examples, the descriptions involved a user's mobile telephony device arriving at and departing from the user's residence. However, the above description is equally applicable to what could occur to implement and later cancel call termination instructions when a user arrives at or departs from his office. Of course, the call termination instructions that would be implemented would be call termination instructions specific to the user's office. However, the same basic procedures could be followed to implement and/or cancel call termination instructions when a user comes within range of a wireless network maintained at the user's office.

Figure 3:
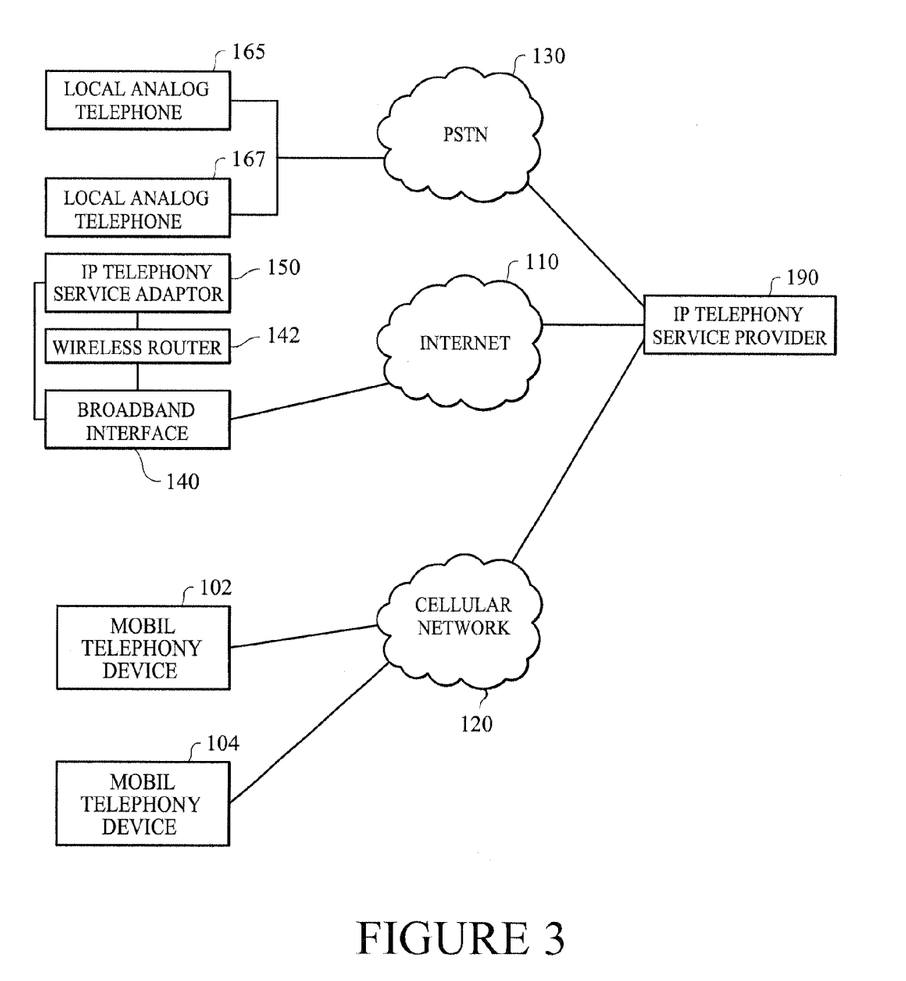
FIG. 3 is a diagram illustrating elements of alternate systems which could be used to automatically issue call termination instructions in accordance with the subject invention.

FIG. 3 illustrates another arrangement of elements of a system that can be used to automatically implement and cancel call termination instructions for a mobile telephony device based on proximity of the mobile telephony device to a particular location. This embodiment illustrates that the local telephones in the residence can be connected to a normal PSTN, and that the local telephones need not be provided with telephony service by the same entity that provides telephony service to the mobile telephony device.

As illustrated in FIG. 3, one or more mobile telephony devices 102, 104 are provided with telephony service by an IP telephony service 190 via a cellular network 120. As also illustrated in FIG. 3, a broadband interface 140 and a wireless router 142 are located in a user's residence. An IP telephony service adaptor 150 might also be located in the residence. As with the embodiments described above, the IP telephony service adaptor 150 could be coupled to the broadband interface 140 and/or to the wireless router 142 via wired or wireless connections. Also present in the user's residence are two analog telephones 165, 167 that are provided with telephony service through a traditional PSTN.

With a configuration as illustrated in FIG. 3, when the IP telephony service provider 190 receives a notification that a user's mobile telephony device has arrived at the residence, the IP telephony service provider causes the implementation of call termination instructions. Those call termination instructions could include an instruction that incoming calls directed to the mobile telephony device 102 be re-directed to the user's home telephones 165, 167. The fact that the home telephones 165, 167 are provided with telephony service by a telephony service provider other than the IP telephony service provider 190 does not prevent this from occurring. Instead, the IP telephony service provider 190 would simply redirect incoming calls to the mobile telephony device 102 to the telephone number associated with the home telephones 165, 167 in the user's residence. Also, if the mobile telephony device 102 is provided with telephony service from a third party service provider, the IP telephony service provider 190 would issue call termination instructions to the third party service provider to effect the implementation and cancellation of call termination instructions.

Figure 4:
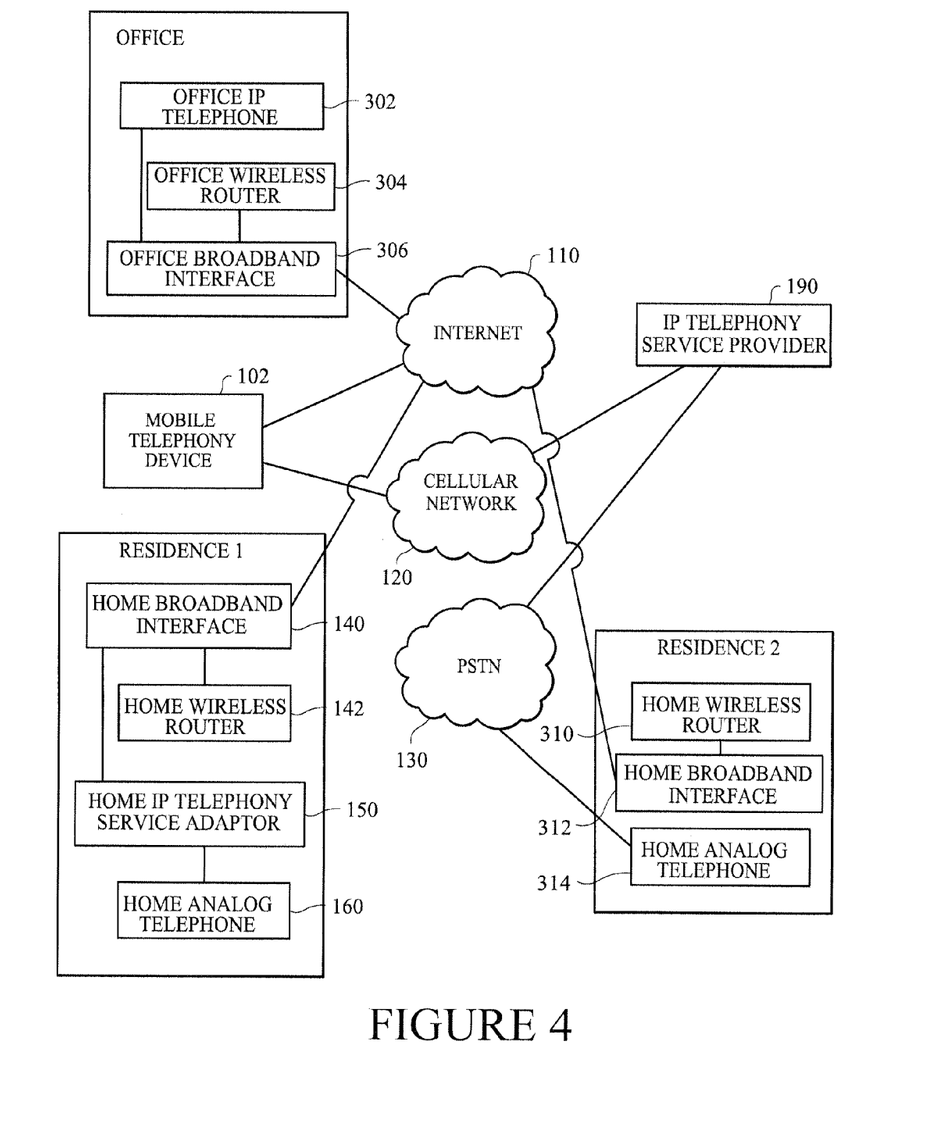
FIG. 4 is a diagram illustrating elements of alternate systems which could be used to automatically issue call termination instructions in accordance with the subject invention.

FIG. 4 illustrates another arrangement of elements that provides automatic call termination services. The arrangement illustrated in FIG. 4 includes elements present at a user's office, elements present at the user's first residence, and elements present at the user's second residence.

As shown in FIG. 4, an office broadband interface 306 at the user's office is coupled to the Internet 110, and to an office wireless router 304 at the user's office. There is also an office IP telephone 302 present in the user's office, which is used to make and receive business telephone calls.

As also shown in FIG. 4, a home broadband interface 140 in the user's first residence is coupled to the Internet 110, and to a home wireless router 142. A home IP telephony adaptor 150 is also coupled to the broadband interface 140. A home analog telephone 160 is coupled to the home IP telephony service adaptor 150.

The user also has a second residence, and a home broadband interface 312 at the user's second residence is coupled to the Internet 110 and to a home wireless router 310 at the second residence. A home analog telephone 314 at the user's second residence is provided with telephony service via a traditional PSTN 130. The user has a mobile telephony device 102, which is provided with service by a cellular network 120.

When the user arrives at his office, the user's mobile telephony device 102 communicates with the office wireless router 304 to establish a wireless data link. Using any of the methods described above, a message is sent to the IP telephony service 190 provider to inform the IP telephony service provider 190 that the user's mobile telephony device has arrived at the office. The IP telephony service provider automatically causes the implementation of call termination instructions appropriate to the user's presence in the office. For example, the office call termination instructions result in all incoming calls directed to the user's mobile telephony device being re-directed to the user's office IP telephone 302. As explained above, this could be accomplished by having the IP telephony service 190 issue instructions to the cellular network to cause the appropriate routing of calls directed to the mobile telephony device 102.

Alternatively, or in addition, when the IP telephony service receives a notification that the user's mobile telephony device has arrived at the office, the IP telephony service provider 190 causes a push notification to be sent to the user's mobile telephony device 102 to ask the user is he would like office call termination instructions to be implemented. The office call termination instructions would then only be implemented if the user agrees.

When the user leaves his office, and the wireless link between the user's mobile telephony device 102 and the office wireless router 304 is broken, another message is sent to the IP telephony service provider 190. The IP telephony service provider 190 issues call termination instructions to the cellular service provider 120 to cause the cancellation of the office termination instructions. Alternatively, or in addition, the IP telephony service provider causes a push notification to be sent to the user's mobile telephony device to ask if the user wants the office termination instructions to be canceled, and the office call termination instructions would only be canceled if the user agrees.

The user might then travel to his first residence. When one of the elements on the wireless network at the user's first residence establishes communications with the user's mobile telephony device 102, a message is sent to the IP telephony service provider 190 to inform the IP telephony service provider that the mobile telephony device has arrived at the first residence. As noted above, this could occur in multiple different ways, and the message itself could be sent by the mobile telephony device 102, the wireless router 142 or the home IP telephony service adaptor 150. The IP telephony service provider 190 then automatically causes the implementation of the user's home call termination instructions that apply to the user's first residence.

Similarly, if the user were to instead travel from his office to the second residence, once communications have been established between the user's mobile telephony device 102 and one of the elements of a wireless network at the user's second residence, a message is sent to the IP telephony service provider 190 to the effect that the mobile telephony device 102 has arrived at the user's second residence. The IP telephony service provider 190 then automatically causes the implementation of call termination instructions applicable to the user's second residence.

In the examples described above, the IP telephony service 190 causes the implementation and cancellation of the call termination instructions. Alternatively, when the mobile telephony device 102 arrives at or leaves a particular location, the mobile telephony device 102, the wireless router 142 or the home IP telephony service adaptor 150 could send communications directly to the third party telephony service provider to cause the implementation or cancellation of call termination instructions.

With a system as described above, call termination instructions applicable to the user's present location are always automatically implemented. It does not matter where the user travels to, automatic implementation of the appropriate call termination instructions can always be accomplished.

Although the above descriptions related to implementing call termination instructions at one or more static locations, it would also be possible for a user's mobile telephony device to establish communications with a wireless network present in a vehicle. Thus, call termination instructions appropriate for the vehicle could also be automatically implemented. For example, the call termination instructions could cause incoming calls directed to the user's mobile telephony device to instead be routed to a cellular telephone system present in the vehicle. Such a cellular telephone system could provide hands-free operation while the user is driving.

Also, the above examples trigger the automatic implementation of call termination instructions when a user's mobile telephony device comes within range of and begins to communicate with an element of a wireless data network at a particular location. Other methods of triggering the automatic implementation and cancellation of call termination instructions are also possible.

For example, many mobile telephony devices include GPS capabilities which allow the mobile telephony device to determine and report its present location. A user's mobile telephony device could be configured to send a message to the IP telephony service provider 190 whenever the mobile telephony device comes within a certain distance of a predetermined set of latitude and longitude coordinates. When the IP telephony service provider 190 receives that message, it would automatically cause the implementation of certain call termination instructions.

Likewise, the mobile telephony device itself could be configured to send a message to the IP telephony service provider 190 when the mobile telephony device travels a certain distance away from the predetermined coordinates. And when the IP telephony service provider 190 receives that message, it would automatically cause the cancellation of the call forwarding instructions.

Alternatively, the user's mobile telephony device could simply report its present location on a periodic basis. The IP telephony service provider 190 would monitor this information and cause the automatic implementation and cancellation of call termination instructions whenever the mobile device is within a certain distance of a fixed location.

Under these scenarios, the IP telephony system 190 need not be the entity that provides service to the mobile telephony device. The mobile telephony device, or an application loaded on the mobile telephony device, could report the device's location to the IP telephony service 190, and the IP telephony service could then cause the automatic implementation and cancellation of call termination instructions that are implemented by the third party telephony services provider by sending communications to the third party service provider.

In still other embodiments, an application resident on a mobile telephony device could monitor the location of the mobile telephony device. When the application determines that the mobile telephony device has entered a predetermined location, the mobile telephony device could automatically issue call termination instructions to the telephony service provider that provides service to the mobile telephony device to cause the implementation of a predetermined set of call termination instructions. Likewise, when the application determines that the mobile telephony device has left the predetermined location, the mobile telephony device could issue new instructions to the telephony service provider to cause the cancellation of the call termination instructions.

In the examples given above, call termination instructions are used to redirect an incoming telephone call directed to a user's mobile telephony device to an alternate telephone number, such as the telephone number associated with the user's home telephones. In some embodiments, the elements of the system could go even farther in controlling the device to which the incoming telephone call is connected. An example is given in connection with FIG. 1, and the method steps illustrated in FIG. 6.

FIG. 1 shows that in addition to the other elements present in the user's residence, the user also has a local gaming device 170 which is also coupled to the broadband interface 140. A display device 180 may be coupled to the gaming device 170 and/or to the broadband interface 140. Further, an audio and or video interface 172 may also be coupled to the gaming device 172. The A/V interface could be a headset that provides only a microphone to pickup words spoken by a user, or a combination of a microphone and one or more speakers for the user's ears. The A/V interface might further include a video camera that can be used to capture images, video or a combination of audio and video.

Assume that a user has arrived at his residence, and the arrival of the user's mobile telephony device has caused the automatic implementation of call termination instructions. Assume also that the call termination instructions cause all incoming calls directed to the user's mobile telephony device 102 to be redirected to the user's home telephone number. Finally, assume that all calls directed to the user's home telephone number are first received by the IP service provider adaptor 150 present in the user's residence.

Figure 6:
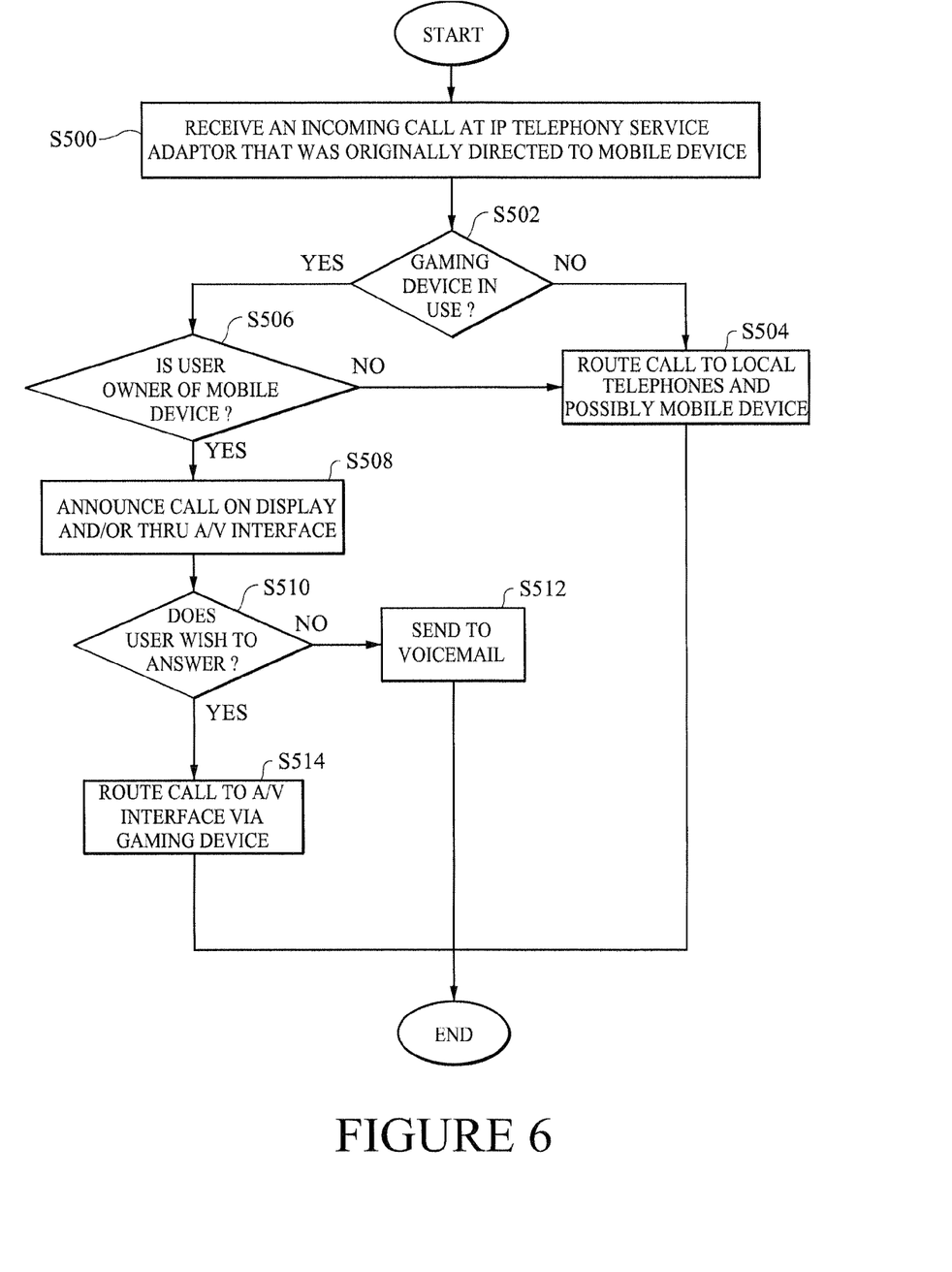
FIG. 6 is a diagram illustrating steps of a method of completing an incoming telephone call to one of a plurality of devices located in a residence in accordance with the subject invention.

The method illustrated in FIG. 6 would begin when the IP telephony service 190 receives a call directed to the user's mobile telephony device 102. After consulting the call termination instructions that are in effect, the IP telephony service 190 would determine that the call should be sent to the IP telephony service adaptor 150 in the user's residence. Thus, at step S500, the IP telephony service adaptor 150 would receive the incoming telephone call.

In step S502, the IP telephony service adaptor 150 would first check to determine if the gaming device 170 is in use. If not, in step S504, the IP telephony service adaptor 150 would route the call on to either the local telephones 160, 162, 164, or to both the local telephones and the mobile telephony device 102, and the relevant devices would begin to ring.

If the check in step S502 reveals that the gaming system 170 is in use, then in optional step S506, the IP telephony service adaptor 150 may check to determine whether the user logged onto the gaming device 170 is the user whose mobile telephony device 102 was originally called.

For example, the Xbox video game console manufactured by Microsoft Corporation of Redmond, Wash. employs a unique identifier, which is also known as a "gamer tag". In order to confirm that the user logged into the gaming device is the operator of the mobile telephony device that is being called, the mobile telephony device owner can create an association between the mobile telephony device and the game console. In this particular example, the gamer tag is associated with a mobile device id. Such an association can be made via a data entry operation in a web account interface or via other similar operations, as is known to those skilled in the art.

If the user logged into the gaming device 170 is not the user whose mobile telephony device was called, the method proceeds to step S504, and the call is directed to one or more of the local telephones 160, 162, 164 and possibly also to the user's mobile telephony device 102. In situations where it is not possible for the IP telephony service adaptor 150 to determine if the user that is logged onto the gaming device 170 is the same user whose mobile telephony device 102 was called, step S506 would be skipped.

If step S506 is skipped, or if the IP telephony service adaptor 150 is able to determine that the user logged onto the gaming device 170 is the user whose mobile telephony device 102 was called, then in step S508, the incoming call is announced on the display 180 and/or via the NV interface attached to the gaming device 170. For example, the call announcement could be a text notification that appears on the display screen. Alternatively, or in addition, the call announcement could be a ring tone played over the NV interface, or a speech announcement that there is an incoming call. The call announcement could include information about the identity or telephone number of the calling party. The call announcement could also include information about which telephone number the call was originally directed to.

The call announcement could provide the user with the ability to accept or decline the incoming call. To accept or decline the call, the user might take some action on a controller connected to the gaming device 170. Alternatively, the user might be able to issue a spoken command that is received via the A/V interface.

In step S510, a determination is made as to whether the user wishes to accept or decline the call. If the user declines the call, the method proceeds to step S512, and the call is routed to a voicemail facility. As noted above, the call forwarding instructions may dictate that the call is routed to a voicemail facility associated with the user's mobile telephony device 102, or to a voicemail facility associated with the user's home telephone number.

If the user accepts the incoming call, in step S514, the incoming call will be routed to the A/V interface coupled to the gaming device 170. This may allow the user to proceed with the incoming call while continuing to utilize the gaming device 170.

In all of the methods described above, after call termination instructions have been implemented, incoming calls may be directed to telephony devices that are different from the telephony devices associated with the telephone number dialed by the calling party. For this reason, when an incoming call is being received by a telephony device, various methods could be used to inform the user about what number the caller originally dialed.

For example, a display that is present on a telephony device might display both the telephone number and/or name of the calling party, and also the telephone number and/or name of the called party. Alternatively, and/or in addition, the ring tone that is issued by the telephony device to signal the user that there is an incoming call might differ depending on the number that the calling party dialed. Other methods could also be used to provide the user with information about the number the calling party originally dialed.

In the methods described above, call termination instructions are automatically implemented when a user and his mobile telephony device arrive at a particular location, and those call termination instructions are automatically canceled when the user and his mobile telephony device leave the location. In alternate embodiments, the user and his mobile telephony device leaving a particular location could instead trigger the automatic implementation of a different set of call termination instructions.

For example, a user and his mobile telephony device leaving the user's office could trigger the automatic implementation of call termination instructions that result in incoming telephone calls directed to the user's office telephone number being re-directed to the user's mobile telephony device. Similarly, the user and his mobile telephony device leaving the user's residence could trigger the automatic implementation of call termination instructions that cause incoming telephone calls directed to the user's home telephone number to be redirected to the user's mobile telephony device.

Similarly, a user and his mobile telephony device leaving a particular location could trigger an IP telephony service to cause a push notification to be sent to the user's mobile telephony device, where the push notification asks the user is he would like certain call termination instructions to be implemented.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of terminating a telephony-based communication request, comprising:
   determining when a first telephony device moves to a location within a predefined area
   sending a message to the first telephony device when the first telephony device is first determined to have entered the predefined area, the message causing the first telephony device to present a user of the first telephone device with a first query asking whether telephony-based communication requests should be routed to one or more devices located within the predefined area;
   receiving a first message from the first telephony device that reflects the user's response to the first query; and
   sending first termination instructions from a first telephony service provider to a second telephony service provider that provides the first telephony device with its telephony service only if the received first message indicates that the user wishes for telephone-based communication requests to be routed to one or more devices located within the predefined area, the first termination instructions causing a telephony-based communication request directed to the first telephony device to be routed to one or more devices located within the predefined area.

2. The method of claim 1, wherein a telephony based communication request directed to the first telephony device is routed only to the first telephony device if the first telephony device is not determined to have moved to a location within the predefined area.

3. The method of claim 1, wherein the first termination instructions cause the telephony-based communication request to be routed to a device other than a telephony device, the device being located within the predefined area.

4. The method of claim 1, wherein the first termination instructions cause the telephony-based communication request to be routed to a second telephony device that is located within the predefined area.

5. The method of claim 4, wherein if the first telephony device is determined to have moved to a location within the predefined area, and the telephony based communication request is a telephone call, and the call is not answered at the second telephony device, the first termination instructions also cause the telephone call to be routed to a voicemail service associated with the second telephony device.

6. The method of claim 1, wherein the first termination instructions cause the telephony-based communication request to be substantially simultaneously routed to both the first telephony device and a second telephony device located within the predefined area.

7. The method of claim 6, wherein the first termination instructions cause the telephony-based communication request to be connected to whichever of the first and second telephony devices that first answer the communication request.

8. The method of claim 1, wherein the determining step comprises utilizing location information reported from the first telephony device to determine when the first telephony device moves to a location within the predefined area.

9. The method of claim 1, wherein the method further comprises:
   determining when the first telephony device moves to a location outside the predefined area;
   sending a message to the first telephony device when the first telephone device is first determined to have moved outside the predefined area, the message causing the first telephone device to present the user with a second query asking whether telephony-based communication requests should be routed only to the first telephony device;
   receiving a second message from the first telephony device that reflects the user's response to the second query; and
   sending a second termination instructions from the first telephony service provider to the second telephony service provider only if the received second message indicates that telephony-based communications requests should be routed only to the first telephony device, wherein the second termination instructions cause telephony-based communication requests directed to the first telephony device to be routed only to the first telephony device.

10. A system for terminating a telephony-based communication request, comprising:
    means for determining when a first telephony device moves to a location within a predefined area;
    means for sending a message to the first telephony device when the first telephony device is first determined to have entered the predefined area, the message causing the first telephony device to present a user of the first telephony device with a first query asking whether telephony-based communication requests should be routed to one or more devices located within the predefined area;
    means for receiving a first message from the first telephony device that reflects the user's response to the first query; and
    means for sending termination instructions from a first telephony service provider to a second telephony service provider that provides the first telephony device with its telephony service only if the received first message indicates that the user wishes for telephony-based communication requests to be routed to one or more devices located within the predefined area, the termination instructions causing a telephony-based communication request directed to the first telephony device to be routed to one or more devices located within the predefines area.

11. A system for terminating a telephony-based communication request, comprising:
    a determining unit that determines when a first telephony device moves to a location within a predefined area; and
    a terminating unit which is part of a first telephony service provider, the terminating unit:

sending a message to the first telephony device when the first telephony device is first determined to have entered the predefined area, the message causing the first telephony device to present a user of the first telephony device with a first query asking whether telephony-based communication requests should be routed to one or more devices located within the predefined area;

receiving a first message from the first telephony device that reflects the user's response to the first query; and sending first termination instructions to a second telephony service provider that provides the first telephony device with its telephone service only if the received first message indicates that the user wishes for telephony-based communication requests to be routed to one or more devices located within the predefined area, the first termination instructions causing a telephony-based communication request directed to the first telephony device to be routed to one or more devices located within the predefined area.

12. The system of claim 11, wherein when the first telephony device is determined to have moved to a location within the predefined area, the first termination instructions sent from the terminating unit cause the telephony-based communication request to be routed to a device other than a telephony device, the device being located within the predefined area.

13. The system of claim 11, wherein when the first telephony device is determined to have moved to a location within the predefined area, the first termination instructions sent from the terminating unit cause the telephony-based communication request to be routed to a second telephony device that is located within the predefined area.

14. The system of claim 13, wherein when the first telephony device is determined to have moved to a location within the predefined area, and the telephony based communication request is a telephone call, and the call is not answered at the second telephony device, the terminating unit causes the telephone call to be routed to a voicemail service associated with the second telephony device.

15. The system of claim 11, wherein the first telephony device is determined to have moved to a location within the predefined area, the termination instructions send from the terminating unit cause the telephony-based communication request to be substantially simultaneously routed to both the first telephony device and a second telephony device located within the predefined area.

16. The system of claim 11, wherein the determining unit uses location information reported from the first telephony device to determine when the first telephony device moves to a location within the predefined area.

17. The method of claim 1, wherein sending first termination instructions comprises sending call forwarding instructions to the second telephony service provider.

18. The method of claim 8, wherein the location information comprises location coordinates determined by a global positioning system (GPS) unit that is present in the first telephony device.

19. The system of claim 11, wherein the first termination instructions are call forwarding instructions.

20. The system of claim 16, wherein the location information comprises location coordinates determined by a global positioning system (GPS) unit that is present in the first telephony device.

21. The method of claim 1, further comprising:

determining when the first telephony device has moved to a location outside the predefined area; and sending, when the first telephony device is determined to have moved to a location outside the predefined area, second termination instructions from the first telephony service provider to the second telephony service provider, the second termination instructions causing a telephony-based communication request directed to the first telephony device to be routed only to the first telephony device, instead of to the one or more devices located within the predefined area.

22. The system of claim 11, wherein the determining unit also determines when the first telephony device has moved to a location outside the predefined area, and wherein the terminating unit sends second termination instructions to the second telephony service provider, the second termination instructions causing a telephony-based communication request directed to the first telephony device to be routed only to the first telephony device, instead of to the one more devices located within the predefined area.

23. A method of terminating a telephony-based communication request, comprising:

determining when a first telephony device has moved to a location outside of a predefined area;

sending a message to the first telephony device when the first telephony device is first determined to have moved outside the predefined area, the message causing the first telephony device to present the user of the first telephony device with a query asking whether telephony-based communication requests should be routed only to the first telephony device;

receiving a message from the first telephony device that reflects the user's response to the query; and sending termination instructions from a first telephony service provider to a second telephony service provider that provides the first telephony device with its telephony service only if the received message indicates that telephony-based communication requests should be routed only to the first telephony device, the termination instructions canceling previously implemented call forwarding instructions that caused telephony-based communication requests directed to the first telephony device to be forwarded to a second telephony device and resulting in telephony-based communication requests directed to the first telephony device being routed only to the first telephony device.

* * * * *